NOISE REDUCTION IN PHASE SHIFT MODULATION
Filed Oct. 12, 1953 3 Sheets-Sheet 1
Fig. I.
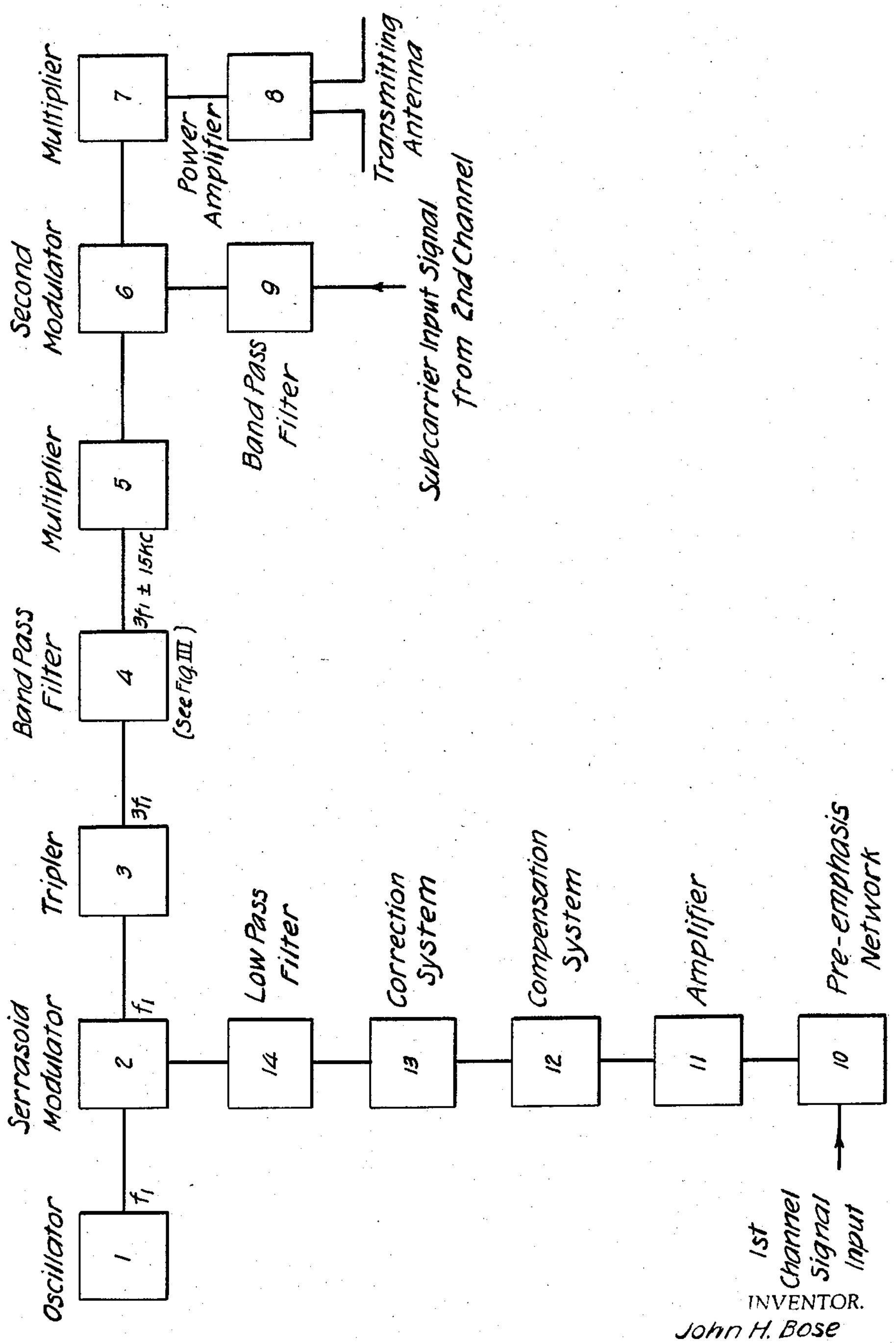
INVENTOR.
John H. Bose
BY Moses, Nolte, Crews & Berry
ATTORNEYS NOISE REDUCTION IN PHASE SHIFT MODULATION
Filed Oct. 12, 1953 3 Sheets-Sheet 2
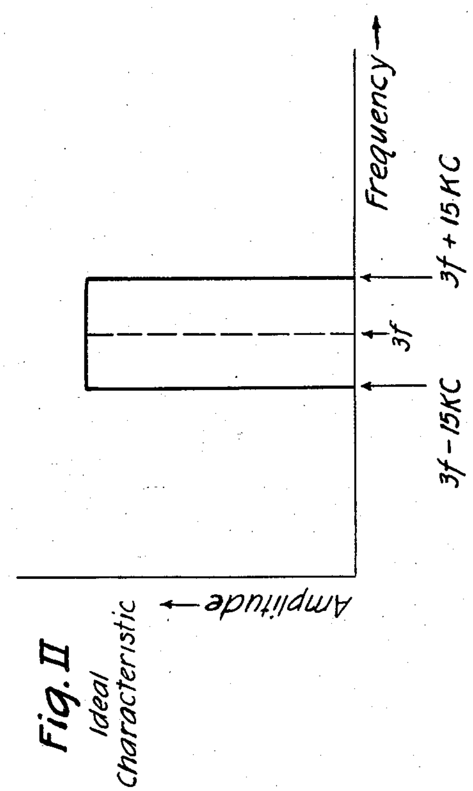
Fig. II
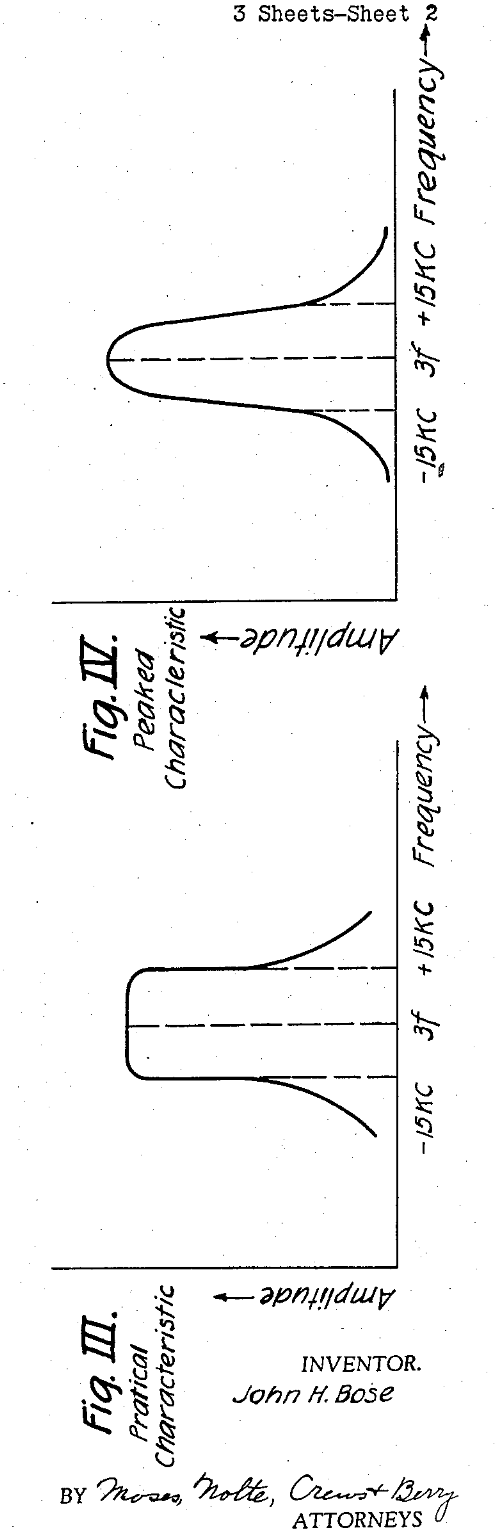
Fig. III, Fig. IV.
INVENTOR.
John H. Bose
BY Moses, Nolte, Crews & Berry
ATTORNEYS Jan. 27, 1959 J. H. BOSE 2,871,292
NOISE REDUCTION IN PHASE SHIFT MODULATION
Filed Oct. 12, 1953 3 Sheets-Sheet 3
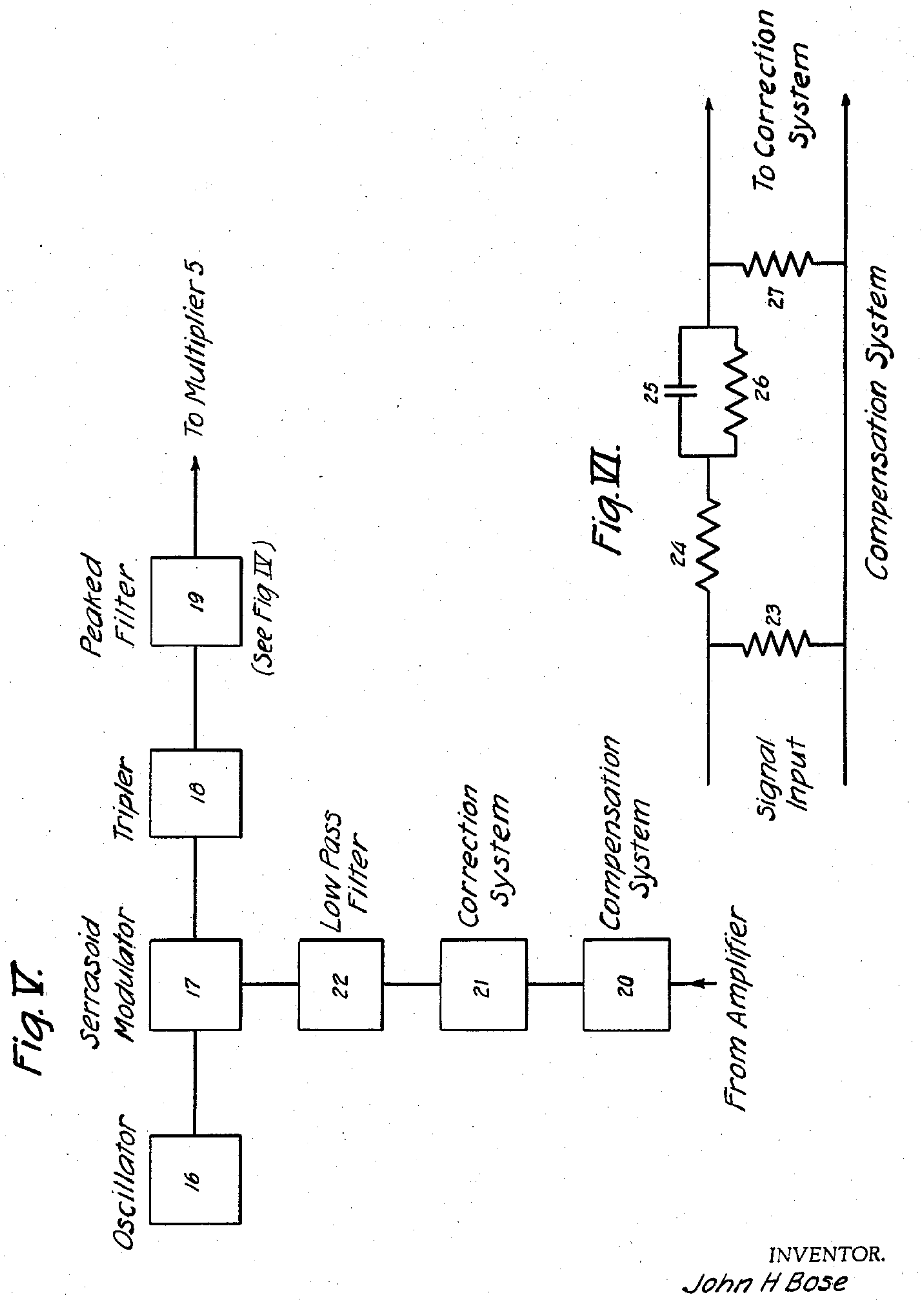
Fig. V. Fig. VI.
INVENTOR.
John H Bose
BY Moses, Nolte, Crews & Berry
ATTORNEYS 2,871,292
Patented Jan. 27, 1959

2,871,292

NOISE REDUCTION IN PHASE SHIFT MODULATION

John H. Bose, New York, N. Y., assignor to Esther Marion Armstrong, executrix of the estate of Edwin H. Armstrong, New York, N. Y.

Application October 12, 1953, Serial No. 385,345

2 Claims. (Cl. 179—15)

This invention has for its object the reduction of noise in the phase shift type of frequency modulation transmitter when used in multiplex signalling.

The particular problem to the solution of which this invention is directed, arises from the fact that the thermal and tube noise currents that exist in the initial oscillating and modulating circuits of a phase shift type of frequency modulator produce random phase shifts, which, while initially small, are able when subjected to the many fold frequency multiplications of the system, to produce in the receiver a background hiss which is of sufficient amplitude to be objectionable.

The problem has been satisfactorily solved for simplex operation by means of the double channel type of modulator or by the use of a modulator of the Serrasoid type where, by reason of the provision of greater initial phase shift, the amount of frequency multiplication that is required is reduced, with a corresponding decrease in the background disturbance. In multiplex signalling the problem is much more vexing since the extent of the frequency deviation caused by the tube noise is directly proportional to the frequency difference between the oscillator frequency and any particular noise component; hence noise components lying 30,000 cycles away from the carrier, which is the range wherein the multiplexed currents in a broadcast system would lie, will cause greater disturbances than those components lying within the frequency range of good audibility with respect to the carrier.

In Patent #2,630,497 there is shown a method of overcoming this noise problem by arranging to use two modulators, one for the main channel and one for the auxiliary channel, in cascade with a certain amount of frequency multiplication between them and a filtering means in the multiplier chain so that the second channel, which required substantially less multiplication than the main channel is protected from noises originating in the initial circuits of the main channel.

This is accomplished by providing a band pass filter, preferably at an early point in the multiplier chain which is just wide enough to pass a band consisting of the carrier frequency, plus and minus the highest modulating frequency it is desired to transmit. In standard FM broadcast practice, this would be plus and minus 15,000 cycles. Noise frequencies lying at a greater distance from the carrier and in the multiplexed frequency range are thus prevented from affecting the second channel.

The present invention discloses means for increasing the ability of the filtering apparatus to exclude noise from the second channel, or any additional number of higher frequency subcarrier channels, while at the same time simplifying the arrangement and reducing the cost of the modulating equipment. This is accomplished by designing the filter to be substanitally narrower in its pass band width than necessary to pass the full band of modulated carrier frequencies at uniform amplitude and compensating for the distortion producing loss in the transmission of the high side bands by increasing the percentage phase shift over that required to produce a uniform frequency modulation in the manner hereinafter described.

Referring now to the figures which form a part of this specification, Fig. I shows the general arrangement of a modulating system of the phase shift type for multiplexing in accordance with the principles of Patent #2,630,497 and Fig. II illustrates the theoretically desirable but practically unattainable filter characteristic for such a system.

Fig. III illustrates a filter characteristic which can be practically obtained but which it is desired to improve without undue complication and cost.

Fig. IV illustrates the characteristic of the filter which, in accordance with the disclosure of this specification, is substituted for the characteristic of Fig. III and Fig. V shows the means by which the distorting effect of the characteristic of Fig. IV on the uniformity of the frequency characteristic of the system is eliminated while retaining its noise protection effect for the second channel with respect to random phase shift noise originating in the oscillator circuits of the first channel. Fig. VI illustrates the circuit arrangement by means of which the attenuating effect of the extra selectivity of the filtering system in the output of the first multiplier stage is neutralized or compensated for.

Referring now to Fig. I there is illustrated a Serrasoid multiplex transmitter essentially the same as that described in Fig. III of U. S. Patent #2,630,497 except for the characteristic of the band pass filtering system in the output of the first multiplier and the introduction of a compensating network in the modulation path whose purpose will appear hereinafter.

In Fig. I, 1 represents the usual crystal oscillator, 2 a Serrasoid modulator as described in U. S. Patent #2,566,826, 3 a frequency multiplier which may conveniently be a tripler, 4 a band pass filter having the special characteristics hereinafter described, 5 a multiplier, 6 a phase shift modulator, 7 a further multiplier and 8 the power amplifier to raise the power output to the desired level for transmission. The second or auxiliary modulator 6 is supplied with the usual sub-carrier modulation thru a band pass filter 9, suitably designed to limit the swing of the auxiliary channel to prevent overswinging into the range of the first channel. The main modulating input channel 10—14 is arranged in the normal way for modulating a phase shift type of frequency modulator with the exception that there is inserted a compensating network 12 designed to restore uniformity to the modulation characteristic of the wave after passing thru the noise removing filter 4.

Referring now to Figs. II, III and IV the object of the invention may be more clearly understood. Fig. II represents the theoretically desired ideal characteristic of the noise removing band pass filter 4 in the output of the first multiplier 3, namely a filter which would pass uniformly the multiplied mid-frequency and the plus and minus side frequencies up to the maximum modulating frequency with an abrupt cut-off of all frequencies lying outside this range. In the case of high quality broadcasting this is ±15,000 cycles. At this point in the multiplier chain it should be noted that there are no second order side frequencies as the phase shift of the modulator for full modulation of the transmitter at 15,000 cycles modulation frequency is very small; in fact, under one degree. A filter characteristic such as Fig. II which effectively cuts off all frequencies arising from minute random phase shifts in the modulated carrier wave caused by tube and thermal noise in the oscillator and modulator beyond the range of the modulation frequency band would effectively shield the second modulator from the noise producing effects of these currents.

Since, however, the practical filter has a characteristic more closely approaching that illustrated by Fig. III, it is clear that some tube noise phase disturbances displaced in frequency by the subcarrier frequency will be passed so that there will appear in the finally transmitted modulated wave a frequency modulated spectrum having the usual noise characteristic which will be duly indicated as a hissing sound in the receiver. It is however, possible to remove the effects of these disturbances in the subcarrier frequency range by employing an extra highly selective form of filter having a peaked pass band characteristic such as illustrated graphically by the characteristic of Fig. IV and it has been found in practice that an effective filter can be readily designed which will fully protect the second channel from the noise originating in the early stages of the first channel.

However, such selectivity destroys the frequency characteristic of the first channel by attenuating the higher side frequencies of the modulation on that channel to an extent which prevents faithful reproduction of the program. As previously pointed out, this difficulty is then overcome by inserting in the input portion of the main modulation channel a corrective compensating network 20 in the position illustrated in Fig. V the network 20 having a circuit arrangement as shown in Fig. VI. This network has a rising transmission characteristic whereby the lower frequencies are attenuated to a greater extent than the higher frequencies and hence provides a higher degree of modulation for the higher main channel modulating frequencies which are unduly attenuated by the peaked noise removing filter 19. By proper design an accurate compensation may be effected. It is important to note here that it is possible to cut down or attenuate the higher side frequency components of a frequency modulated wave in the manner described without creating distortion products of a higher order that would fall in the higher frequency subcarrier spectrum only by reason of certain special circumstances of operation. These circumstances arise from the fact that the overall excursions or deviations of frequency of the wave at the point where the noise removing filter 4 or 19 is inserted is of the order of only a few hundred cycles and hence for the higher modulating frequencies of the main channel only one pair of bands of side frequencies exists. Hence, while these frequencies are reduced in amplitude and their phase relations with respect to the carrier advanced and retarded respectively, this phase relationship is not altered appreciably by the swing of the lower frequency components of the modulation. As a consequence any amplitude variations resulting from the displacement of the side frequencies from their normal position may be limited out by the succeding multipliers without introducing cross modulation products into the second channel.

It will be understood that the above description applies equally well when more than one auxiliary channel is employed and that if necessary or desirable, the peaked noise removing filters may be employed at the output of the adjacent multiplier stages without departing from the spirit of the invention.

I claim:

1. A frequency modulation transmitter, comprising: a phase shift modulator having an input for carrier waves, an input for modulating signals and an output for the modulated carrier waves; a source of carrier waves connected with said carrier wave input of said modulator, said source and said modulator both having inherent characteristics which introduce minute random phase shifts in the modulated carrier waves at said modulator output, said random phase shifts being of the type caused by thermal and tube noise, a frequency multiplier having an input connected to said modulator output and an output, said multiplier multiplying up the frequency of said modulated waves to an extent such that only a single pair of bands of side frequencies is present in said modulated wave at said multiplier output; a noise removing filter having an input and an output, said filter input being connected to said multiplier output, said filter having a peaked relatively narrow band pass transmission characteristic which effectively removes from said frequency multiplied modulated waves all noise components therein produced by said minute random phase shifts and which co-incidentally unduly attenuates the higher frequency components of said pair of side frequencies to an extent which interferes with faithful reproduction of the modulations thereof; signal utilization means including further frequency multiplying means connected to the output of said noise removing filter; an input circuit for modulating signals connected to said modulating signal input of said modulator; and a corrective transmission network included in said last-named input circuit, said network having a rising transmission characteristic which causes the lower frequency components of the modulating signals to be attenuated with respect to the higher frequency components thereof and thereby accentuates the higher side frequencies of said modulated waves to an extent which compensates correctively for said undue attenuation thereof by said filter.

2. A frequency modulation multiplex transmitter, comprising: a first phase shift modulator having an input for carrier waves, an input for modulating signals, and an output for the modulated carrier waves; a source of constant frequency carrier waves supplying said carrier wave input of said first modulator, said source and said modulator both having inherent characteristics which introduce minute random phase shifts in the modulated carrier wave, said random phase shifts being of the type caused by thermal and tube noise; a frequency multiplier having an input coupled to the modulated wave output of said first modulator and an output, said frequency multiplier producing a frequency multiplication of said modulated carrier wave by a factor such that only a single pair of bands of side frequencies is present in the frequency multiplied modulated wave at the output of said multiplier; a second phase shift modulator having a carrier input operatively associated with the output of said multiplier and having an output and an input adapted to have modulating signals of a subcarrier frequency applied thereto; a noise removing band pass filter interposed between the output of said multiplier and said second modulator, said filter having a peaked relatively narrow band pass characteristic which effectively cuts off all frequencies lying in the range of said subcarrier modulated frequencies arising from said random phase shifts and which co-incidentally unduly attenuates the high side frequencies of the frequency multiplied modulated wave to an extent which prevents faithful reproduction of the modulations thereof; and a compensating transmission network coupled to said modulating signal input of said first modulator, said network having a rising transmission characteristic which causes the lower frequency components of the modulating signals to be attenuated with respect to the higher frequency components thereof and thereby accentuates the higher side frequencies of said modulated waves to an extent which compensates correctively for said co-incidental attenuation of said side frequencies by said filter, whereby said second modulator is shielded from the effects of said random phase shifts.

References Cited in the file of this patent

UNITED STATES PATENTS

| | | |
|---|---|---|
| 2,236,134 | Gloess | Mar. 25, 1941 |
| 2,630,497 | Armstrong | Mar. 3, 1953 |
| 2,776,429 | Olerud | Jan. 1, 1957 |